United States Patent [19]

Amos

[11] 3,831,245

[45] Aug. 27, 1974

[54] METHOD OF PRODUCING BALL JOINTS

[75] Inventor: James J. Amos, Delaware, Ohio

[73] Assignee: The Columbus Auto Parts Company, Columbus, Ohio

[22] Filed: Mar. 1, 1973

[21] Appl. No.: 337,187

[52] U.S. Cl. .......................... 29/149.5 B, 29/470.3
[51] Int. Cl. ...................... B21d 53/10, B23k 27/00
[58] Field of Search..... 29/149.5 B, 148.4 A, 470.3, 29/149.5 R, 148.4 R; 287/87

[56] References Cited
UNITED STATES PATENTS

| | | | |
|---|---|---|---|
| 2,265,839 | 12/1941 | Hufferd et al. | 287/87 |
| 2,625,736 | 1/1953 | Klages | 29/148.4 B |
| 3,695,651 | 10/1972 | Stuck | 29/470.3 |

*Primary Examiner*—Thomas H. Eager
*Attorney, Agent, or Firm*—Palmer Fultz, Esquire

[57] ABSTRACT

A method of producing ball joints of the type that include a ball and stem member pivotally mounted in a housing, the method comprising forming separate stem portions and ball portions and joining the portions at welded junctions with frictionally impored heat to provide pivot members of composite construction. Such pivot members are characterized by relatively large ball diameters as compared to the shank diameters so as to provide a high degree of angularity of movement.

6 Claims, 19 Drawing Figures

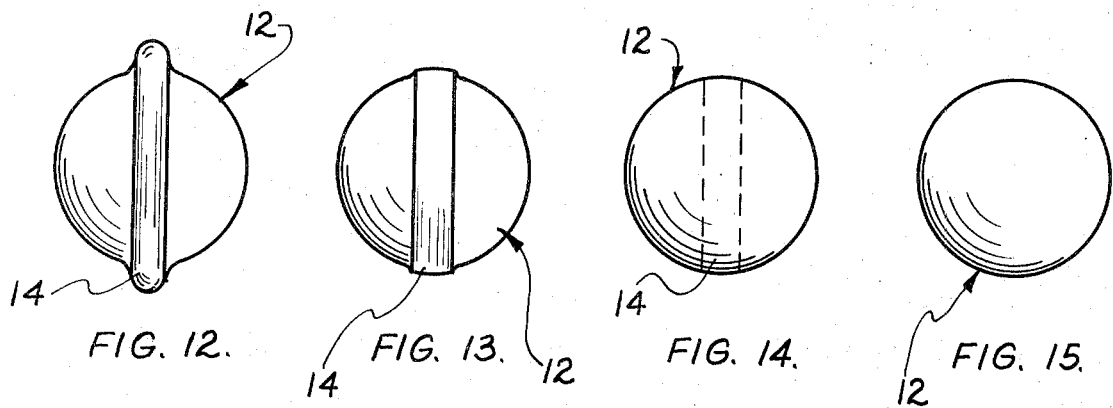
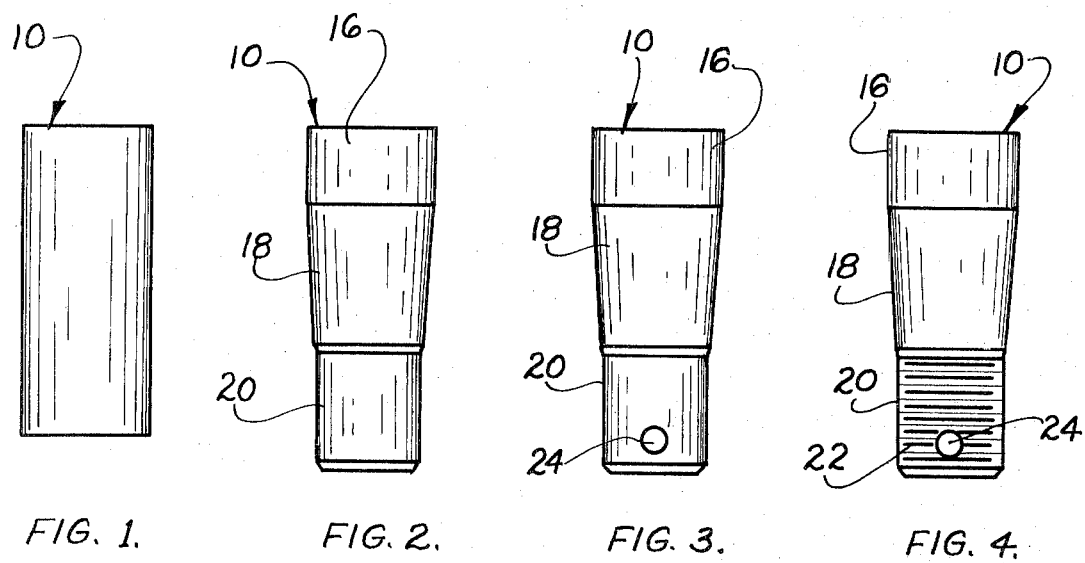

METHOD OF PRODUCING BALL JOINTS

BACKGROUND OF THE INVENTION

This invention relates generally to ball joints of the type that are used in the automotive steering system, and more particularly to a novel method for producing ball joints wherein the pivoted member comprises a stem with a ball on one end, which member is fabricated from separate stem portions and ball portions that are welded together at fused junctions.

PROBLEMS IN THE ART

In the fabrication of the ball joints, it has been common practice in the art to form the pivot members from a single work-piece by forging or cold heading the spherical ball portion on the end of a portion of the work-piece which forms the shank of the pivot member. Such practices have required, in the forming of the ball, the displacement of large volumes of metal and hence forging machines of large size and high capacity.

It should further be mentioned that recent requirements in the art are demanding larger diameter balls for any given diameter or shank in order to provide greater angularity of motion of the shank or stem of the pivoted member after it has been mounted in the housing. Hence such requirements have demanded during the heading process the gathering of much greater portions of the shank metal in order to produce the relatively larger ball. Hence the need for larger, slower and more costly equipment has resulted.

Another problem has become present in the art as the result of newer designs using plastic bearing materials within the housing for pivotally supporting the ball portion of the pivoted member. In the use of such modern plastic bearing materials it has been found that they are subject to cold flow tendencies under the load in the event there are irregularities in the shape of the pivoted ball and hence it has been determined that it is important that the ball ends be as nearly spherical in shape as it is possible to produce.

In accordance with practices in the prior art where the ball portion is integrally formed by cold heading the stud a problem has been present in that there is always a void or unfilled portion on the side of the ball opposite the shank. Such void in the spherical shape of the ball is incompatible with use in supported relationship with plastic bearing materials as mentioned above.

Another problem has been present in the art with the use of the above mentioned plastic bearing materials in that a high quality of finish on the ball is required in order that the ball be compatible with the above mentioned cold flow properties of the plastic bearing materials. That is to say, that the plastic bearing material, under load, tends to lock into any irregularity which may be present in the surface of the ball.

SUMMARY OF THE INVENTION

In general, the present invention comprises a novel method of producing ball joints by forming the pivot members of the joint from separate stem portions and ball portions and by next joining such portions at welded junctions with frictionally inposed heat. Such compositely formed pivot members are next mounted in ball joint housings with the ball portions pivotally supported by suitable bearing means.

As a primary aspect of the present invention, since the ball portions are individually formed, and not integrally formed from the diameter of metal blank used for the shank, it is readily feasible to provide balls of the relatively large diameter without the necessity of gathering large quantities of metals from the shank during the forging operation.

As another aspect of the present invention the composite construction of the pivoted member permits the formation of the stem or shank portions using a relatively small and inexpensive forging machine of the capacity and type used to make bolts and screws.

As another aspect of the present invention, due to the composite construction of the pivoted member the shank portion and ball portion can be formed from different metal alloys so as to best fill the requirements for the different qualities of the ball and shank. That is to say whereas strength and toughness are required in the shank portion, the ball can well be made from a lower grade softer steel.

As another aspect of the present invention, since size combinations between the ball diameter and shank diameter are numerous and frequently changed in the automotive industry, the specific required combination of shank and ball size can be readily changed at any time merely by selecting different sized shanks and balls and joining them together by the welding process.

As another aspect of the present invention due to the composite construction of the pivoted members it is readily possible to accurately form the ball portion to a precise spherical shape which is devoid of voids present in the unfilled die portions such as occurs in the cold heading of the ball portions integrally with the shanks.

As another aspect of the present invention due to the composite construction of the pivoted member the ball portion can be individually and accurately finished without the presence of a shank on the work-piece such that a much higher degree of finish can easily be produced on the surface of the ball.

As still another aspect of the present invention it is possible to form the ball portions of the pivoted members by processes which can produce some porosity on the surface of the ball portions, such as powder metal forming, with such porosity being advantageous in the holding of lubricants in the pores of the ball surface for extended life schedules. At the same time various tough steel alloys with properties required for the job, can be used in the formation of the steel shank portions.

As still another aspect of the present invention, it is readily possible to fill certain requirements where a reverse taper is desired on the shank portion of the pivoted member adjacent the ball. This is sometimes required so as to produce greater angularity of movement of the pivoted member with respect to the housing. Such reverse taper on the ball end of the shank can be produced in the cold heading of the shank blank. This is much simpler than the producing of a reverse taper on the shank in accordance with the prior art where the ball is integrally headed. In such instances, an additional machining or forging operation is required to produce the reverse taper or undercut adjacent the ball. Further objects and advantages of the present invention will be apparent from the following description, reference being had to the accompanying drawings wherein preferred forms of embodiments of the invention are clearly shown.

BRIEF DESCRIPTION OF THE DRAWINGS

FIGS. 1 through 4 illustrate work-pieces used in forming shank portions for ball joints in accordance with the present invention;

FIGS. 12 through 15 are side elevational views of a work-piece used in forming ball portions for the ball joints of the present invention.

DESCRIPTION OF THE EMBODIMENTS

Figure 5:
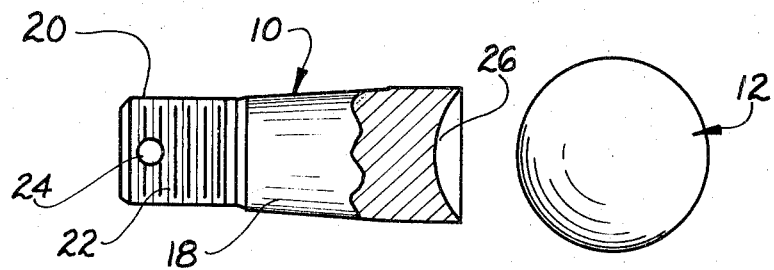
FIG. 5 is a side sectional view, partially in section, of a stem portion and ball portion in confronting relationship prior to welding.

Referring in detail to the drawings a blank for forming a shank portion in accordance with the present invention is indicated generally at 10 in FIG. 1.

FIG. 2 shows the shank work-piece 10 after the wire blank has been shaped in a cold heading machine so as to form a ball receiving end 16, a tapered central portion 18, and a thread-receiving end portion 20.

FIG. 3 shows a shank work-piece 10 after the drilling of a countersink cotter hole 24.

FIG. 4 shows work-piece 10 after the shank has been threaded.

FIG. 5 illustrates one modification of the present invention wherein a shank portion 10 is provided with a concave end surface 26 which preferably conforms substantially with the radius of a ball portion 12.

Figure 6:
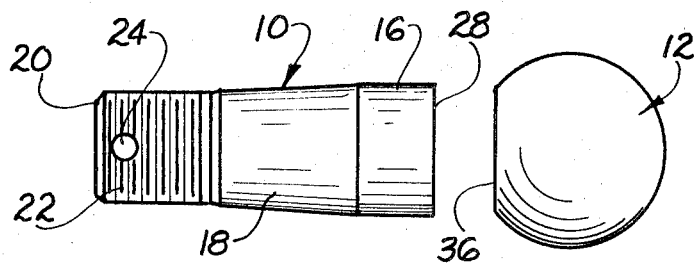
FIG. 6 is a modification corresponding to FIGS. 5.

FIG. 6 is a modified type of shank to ball junction wherein the shank portion 10 is provided with a plane end surface 28 and the ball portion or work-piece 12 is provided with a corresponding plane surface 36.

Figure 7:
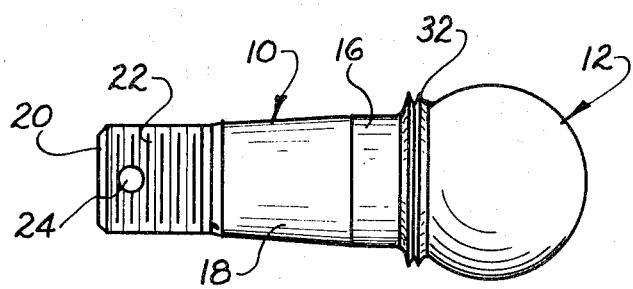
FIG. 7 and FIG. 8 are side elevational views of the pivot member after the portions thereof have been formed together.

Either the embodiment of FIG. 5 or the embodiment of FIG. 6 are joined together by subjecting the work-pieces 10 and 12 to an inertia welding process wherein confronting surfaces of the portions are subjected to relative rotation and thrust so as to join the work-pieces at a fused junction. As a result of the welding it is inherent that a flashing will be produced at the fused junction as seen at 32 in FIG. 7, 18, and 19.

Figure 8:
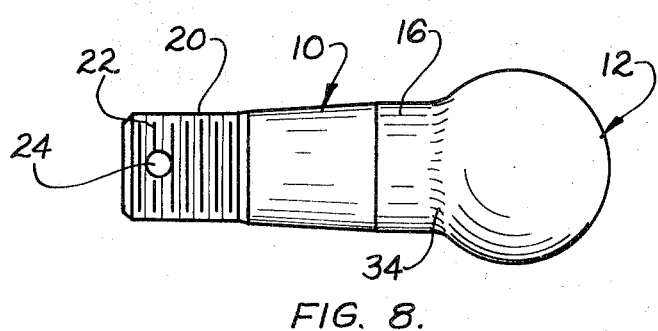

Reference is next made to FIG. 8 which illustrates the composite pivotal member after the flashing 32 has been removed, by machining, so as to provide a smooth junction as seen at 34 in FIG. 8.

Figure 9:
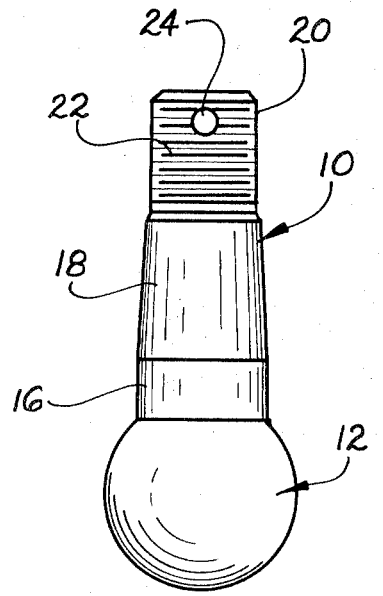
FIG. 9 is a side elevational view of a pivot member for ball joints constructed in accordance with the present invention.

FIG. 9 illustrates the composite pivotal member after it has been polished where the flashing was removed at the fused junction.

Figure 10:
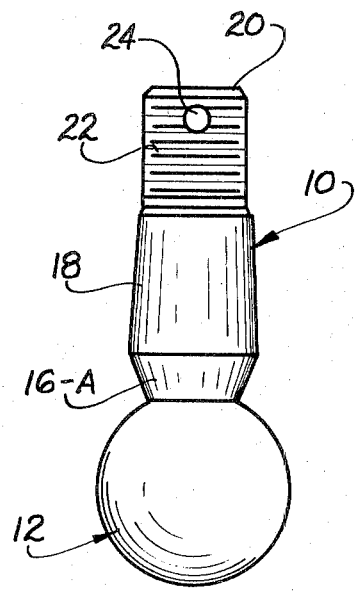
FIG. 10 is a side elevational view of a modified pivot member provided with a reverse taper on the shank portion.

FIG. 10 illustrates a modified pivotal member formed in accordance with the present invention wherein the shank portion is provided with a reverse taper or undercut as is seen in FIG. 10 at 16-A. Such reverse taper is sometimes desired so as to provide greater clearance between the shank and the housing of the ball joint thereby providing greater angularity of movement.

Referring to FIGS. 12 through 15, these figures illustrate various stages in the formation of a ball portion. In FIG. 12 a semi-ball shape is achieved by pressing or cold forming where smaller diameter balls are required. The shape shown in FIG. 12 is achieved by applying pressure to a length of ball stock in the forming dies of the machine.

Since a flashing 14 is formed during the pressing operation, FIG. 12, the blank 12 is de-flashed by rolling the work-pieces between disks which are file cut to provide shaving surfaces. As the balls rotate between the disks the flashing 14 is shaved away.

The ball work-pieces 12 are next subjected to rough grinding to remove any high spots which may be present on the work-piece, and then to finish grinding so as to bring the balls to a spherically accurate and uniform size.

Figure 11:
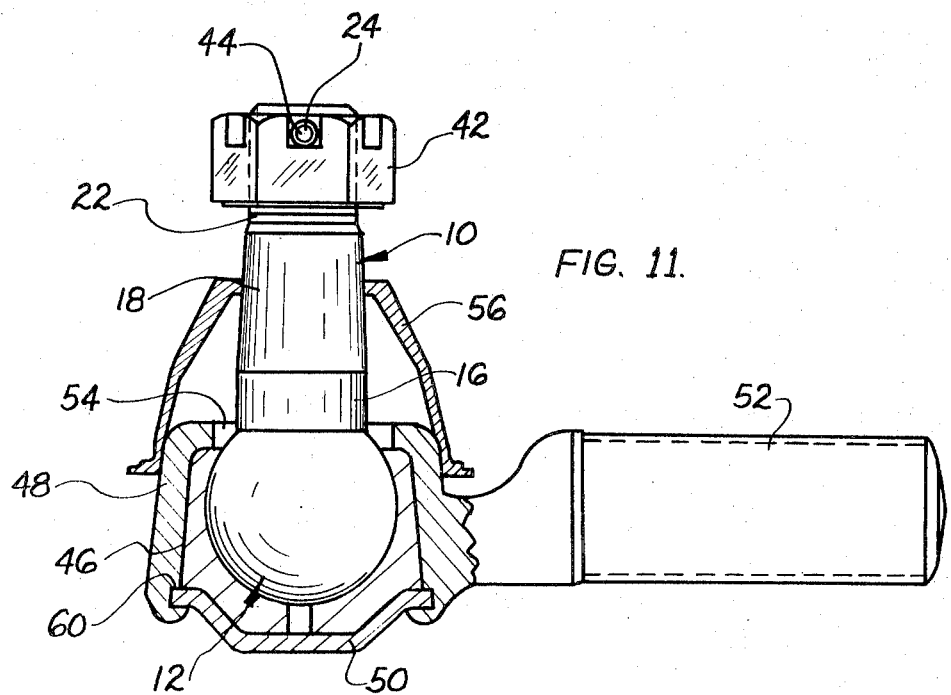
FIG. 11 is a side sectional view of a finished ball joint constructed in accordance with the present invention, with the section being taken along a vertical plane through the center line of the joint.

Reference is next made to FIG. 11 which shows a composite shank portion 10, constructed in accordance with the present invention, mounted in a ball joint housing 48. A bearing material 46 is mounted within the housing and such bearing material is preferably formed of suitable synthetic resinous material with the bearing portion being retained within the housing by crimping a cover 50 in position on housing 48 as seen at 60.

It will be mentioned that the upper portion of the housing is provided with a hole 54 through which the shank portion 10 is extended with such hole being large enough to furnish clearance around the shank portion so as to provide the required angularity of movement for the joint.

The finished ball joint further comprises a dust cover 56, a nut 42 retained by a cotter key 44, and a main stem portion 52 with such main stem portion being threaded so as to permit the mounting of the housing portion of the joint to one of the relatively movable components which are to be connected by the ball joint. The other relatively movable component is mounted to the joint at the shank portion 10.

In accordance with the method of the present invention, the ball portion 12 and the stud portion 10 are formed by inertia welding. This is accomplished by positioning first the previously mentioned ball portion 12 in the stationary die 70 and further by positioning the shank portion 10 in a rotating die portion 72. These two die portions are contiguously positioned such that one of the die portions can be rotated relative to the other. Meanwhile, at the same time, the die portions can be moved towards one another such that thrust can be applied to cause pressure to the two work-pieces.

Figure 16:
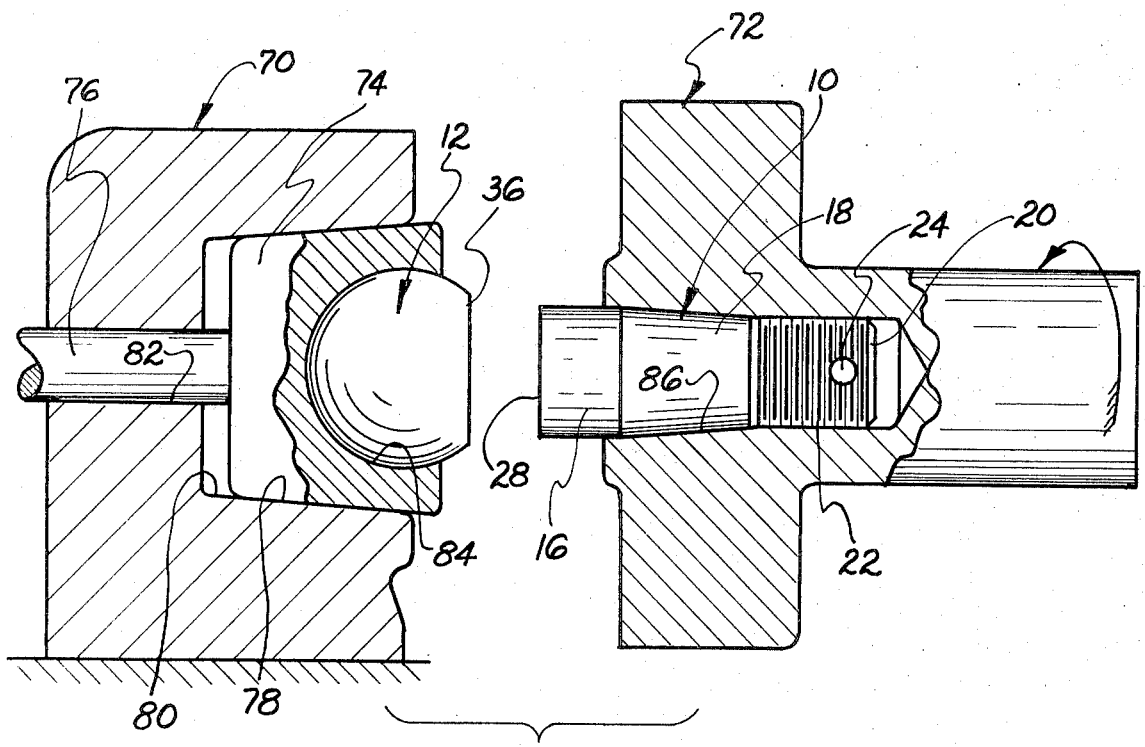
FIGS. 16-19 are side sectional views partially in section showing a method of fabricating ball studs in accordance with the present invention.

FIG. 16 shows the two die portions with their respective work-pieces mounted prior to the application of pressure, thrust, and heat at the same time rotation is imposed.

Figure 17:
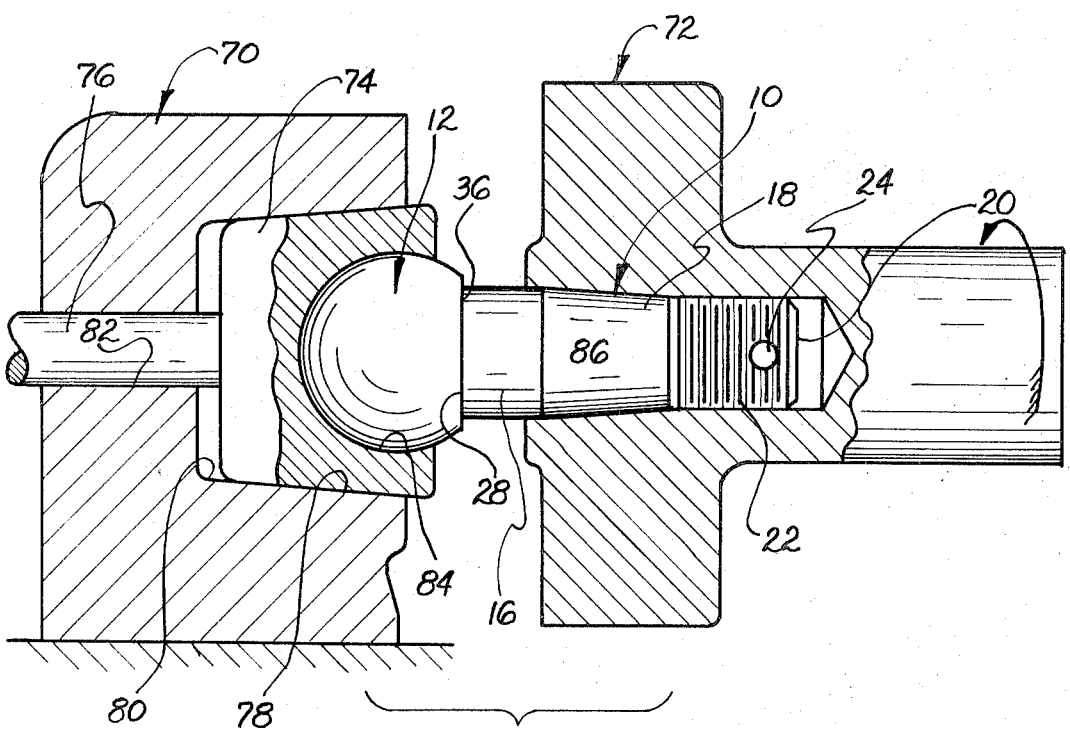

FIG. 17 shows the second stage in the process wherein the two die portions have been rotated, relative to one another, and at the same time thrust is imposed so as to cause heat and pressure to fuse the metal at the junction between the shank portion 10 and the ball portion 12.

Figure 18:
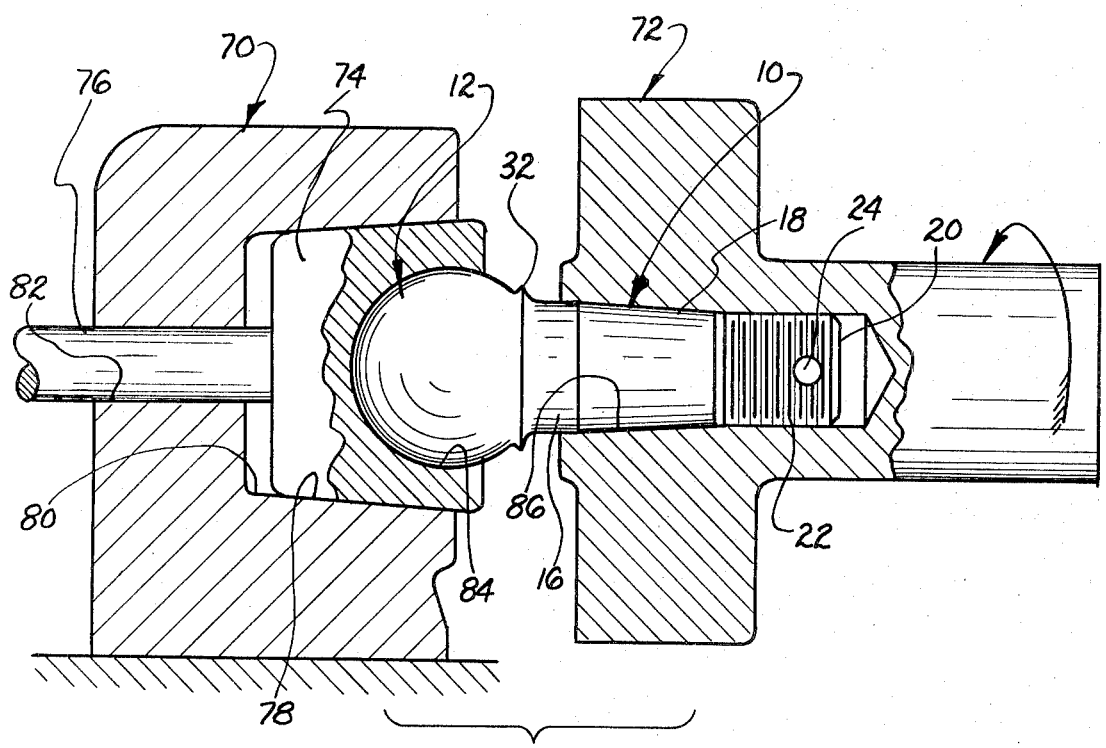
Figure 19:
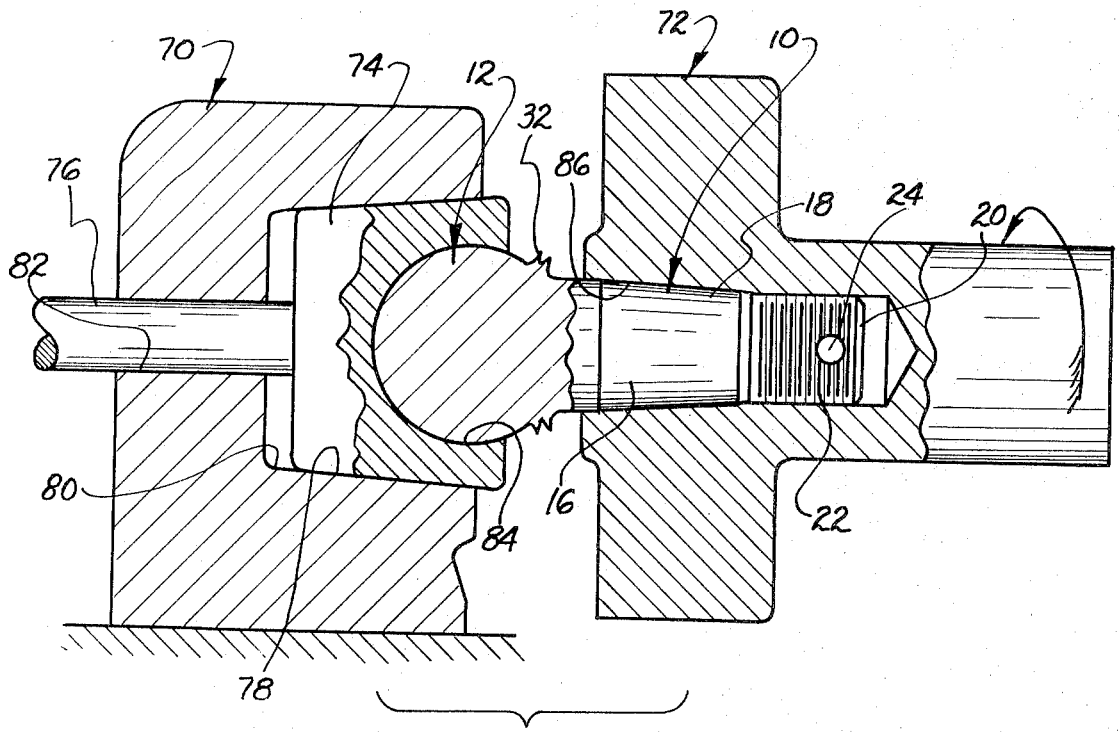

Looking next to FIG. 18, the confronting surfaces of the ball portion 12 and the shank portion 10 including the confronting surfaces 36 and 28 have been brought into contact, with rotation and thrust, such that the metal at the confronting surfaces becomes extremely hot to the point that it melts and fuses. With the rotation, thrust, and pressure being maintained, FIG. 18, the shank portion 10 and the ball portion 12, due to the heat imposed friction, fuse together. Thereafter due to the limited pressure and torque applied by one of the die portions the junction solidifies and freezes the machine thereby stopping the process.

Referring more particularly to the drawings, FIG. 16 shows the two die portions including the stationary die portion 70 and the movable die portion 72. The stationary die portion is provided with a fixture for holding the ball portion previously described including its junction forming surface 36. The die portion that holds it is located at 84 and is mounted in a taper 78 and provided with a push rod 76 located in a bore 82. On the other side of FIG. 16 the rotating die which holds the stem is provided with a recess 86 for mounting the shank portion 10 with its confronting surface 28 facing the surface 36 of the ball portion. Such rotating die portion 72 is adapted to be rotated at substantial speed such that when the die portions 70 and 72 are moved one towards the other then the surfaces 28 and 36 are subjected to heat and pressure and caused to fuse. Such reaction at surfaces 36 and 28 is occurring in FIG. 17 and thereafter shown in FIG. 18 wherein the dissipation of the energy at such surfaces causes the upset 32, FIG. 18.

Thereafter, the fusion of the metal at the surfaces 36 and 28 cease rotation of the rotary die 72 and the piece has been fused. Note the junction 32 in FIG. 19. Thereafter, the movable die portion 72 is retracted from the stationary die portion and the ejecting rod 76 is extended to displace the head from the fixture thereby completing one finished ball stud.

While the forms of embodiments of the present invention as herein disclosed constitute preferred forms, it is to be understood that other forms might be adopted.

What is claimed is:

1. A method of producing ball joints comprising, in combination, forming a stem portion from a stem work-piece in a forging die, said work-piece including a ball-receiving end and a thread-receiving end; forming a ball portion from a ball work-piece of metal stock; clamping said ball portion in a first fixture; clamping said stem portion in a second fixture in contiguous relationship with said ball portion; imparting relative motion to said fixtures; imparting thrust to said fixtures to force one portion against the other such that frictionally imposed heat softens said portions at their interfaces causing the portions to bond at a fused junction; removing flashing produced by the welding at said junction; and mounting said ball and stem assembly in a ball joint housing with said ball portion pivotally supported by a bearing means.

2. A method of producing ball joints comprising, in combination, forming a stem portion from a stem work-piece in a forging die, said work-piece including a concave ball-receiving end and a thread-receiving end; forming a ball portion from a ball work-piece of metal stock; clamping said ball portion in a first fixture; clamping said stem portion in a second fixture in contiguous relationship with said ball portion; imparting relative motion to said fixtures; imparting thrust to said fixtures to force one portion against the other such that frictionally imposed heat softens said portions at their interfaces causing the portions to bond at a fused junction; removing flashing produced by the welding at said junction; and mounting said ball and stem assembly in a ball joint housing with said ball portion pivotally supported by a bearing means.

3. A method of producing ball joints comprising, in combination, forming a stem portion from a stem work-piece in a forging die, said work-piece including a ball receiving end and a thread-receiving end; forming a ball portion from a ball work-piece of metal stock, said ball including a substantially flat surface; clamping said ball portion in a first fixture; clamping said stem portion in a second fixture in contiguous relationship with said ball portion; imparting relative motion to said fixtures; imparting thrust to said fixtures to force one portion against the other such that frictionally imposed heat softens said portions at said ball receiving end and flat surface causing the portions to bond at a fused junction; removing flashing produced by the welding at said junction; and mounting said ball and stem assembly in a ball joint housing with said ball portion pivotally supported by a bearing means.

4. A method of producing ball joints comprising, in combination, forming a stem portion from a stem work-piece in a forging die, said work-piece including a ball-receiving end and a thread-receiving end; pressing a blank of metal sotck in a forming die to form a substantially spherical ball work-piece, said ball work-piece including a flashing portion; removing said flashing portion from said ball work-piece; finishing the outer spherical surface of said ball work-piece at said flashing portion; clamping said ball portion in a first fixture; clamping said stem portion in a second fixture in contiguous relationship with said ball portion; imparting relative motion to said fixtures; imparting thrust to said fixtures to force one portion against the other such that frictionally imposed heat softens said portions at their interfaces causing the portions to bond at a fused junction; removing flashing produced by the welding at said junction; and mounting said ball and stem assembly in a ball joint housing with said ball pivotally supported by a bearing means.

5. A method of producing ball joints comprising, in combination, forming a stem portion from a stem work-piece in a forging die, said work-piece including a concave ball-receiving end and a thread-receiving end; pressing a blank of metal stock in a forming die to form a substantially spherical ball work-piece, said ball work-piece including a flashing portion; removing said flashing portion from said ball work-piece; finishing the outer spherical surface of said ball work-piece at said flashing portion; clamping said ball portion in a first fixture; clamping said stem portion in a second fixture in contiguous relationship with said ball portion; imparting relative motion to said fixtures; imparting thrust to said fixtures to force one portion against the other such that frictionally imposed heat softens said portions at their interfaces causing the portions to bond at a fused junction; removing flashing produced by the welding at said junction; and mounting said ball and stem assembly in a ball joint housing with said ball pivotally supported by a bearing means.

6. A method of producing ball joints comprising, in combination, forming a stem portion from a stem work-piece in a forging die, said work-piece including a ball receiving end and a thread-receiving end; pressing a blank of metal stock in a forming die to form a substantially spherical ball work-piece, said ball work-piece including a flashing portion; removing said flashing portion from said ball work-piece; finishing the outer spherical surface of said ball work-piece at said flashing portion, said ball work-piece including a substantially flat surface; clamping said ball portion in a first fixture; clamping said stem portion in a second fixture in contiguous relationsip with said ball portion; imparting relative motion to said fixtures; imparting thrust to said fixtures to force one portion against the other such that frictionally imposed heat softens said portions at said ball receiving end and flat surface causing the portions to bond at a fused junction; removing flashing produced by the welding at said junction; and mounting said ball and stem assembly in a ball joint housing with said ball pivotally supported by a bearing means.

* * * * *